United States Patent [19]

Neckermann et al.

[11] Patent Number: 6,107,706
[45] Date of Patent: Aug. 22, 2000

[54] ARRANGEMENT FOR THE VIBRATION-ISOLATING SUSPENSION OF AN ELECTRIC MOTOR

[75] Inventors: Marcus Neckermann, Koenigshofen; Heinz Wengrzik, Mergentheim, both of Germany

[73] Assignee: ebm Werke GmbH & Co., Germany

[21] Appl. No.: 09/056,423

[22] Filed: Apr. 7, 1998

[30] Foreign Application Priority Data

Apr. 8, 1997 [DE] Germany ............... 297 06 216 U

[51] Int. Cl.[7] .................................................. H02K 5/24
[52] U.S. Cl. ........................... 310/51; 310/89; 310/91; 310/43
[58] Field of Search ................................. 310/43, 51, 89, 310/91

[56] References Cited

U.S. PATENT DOCUMENTS

| | | | |
|---|---|---|---|
| 2,830,752 | 4/1958 | Wentling | 310/51 |
| 4,639,193 | 1/1987 | Reichert et al. | 416/184 |
| 4,647,803 | 3/1987 | Von Der Heide et al. | 310/51 |
| 4,734,600 | 3/1988 | Bergan et al. | 310/51 |
| 4,850,799 | 7/1989 | Bucher, Sr. et al. | 416/134 R |
| 5,051,636 | 9/1991 | Ishimoto et al. | 310/90 |
| 5,306,123 | 4/1994 | Day et al. | 417/423.7 |
| 5,402,024 | 3/1995 | Watanabe et al. | 310/156 |
| 5,464,323 | 11/1995 | Scofield | 416/134 R |
| 5,871,335 | 2/1999 | Bartlett | 416/244 R |

FOREIGN PATENT DOCUMENTS

| | | |
|---|---|---|
| 1175785 | 10/1962 | Germany. |
| 4121927 | 7/1993 | Germany. |

*Primary Examiner*—Elvin Enad
*Attorney, Agent, or Firm*—Harness, Dickey & Pierce, P.L.C.

[57] ABSTRACT

An arrangement for the vibration-isolating or vibration-damping suspension of an electric motor (1) in particular a fan motor, in a fan housing (2) having a non-rotating motor-supporting element (6) connected to a support part (14) at least on one side via an integral elastic element (12). The elastic element (12) consisting of three sections lying axially one behind another, in precise terms of a support connecting section (16) connected to the support part (14) in a torsion-resistant manner, of a motor connecting section (18) connected to the supporting element (6) in a torsion-resistant manner, and also of elastically deformable intermediate section (20) arranged between the two connecting sections (16, 18).

22 Claims, 2 Drawing Sheets

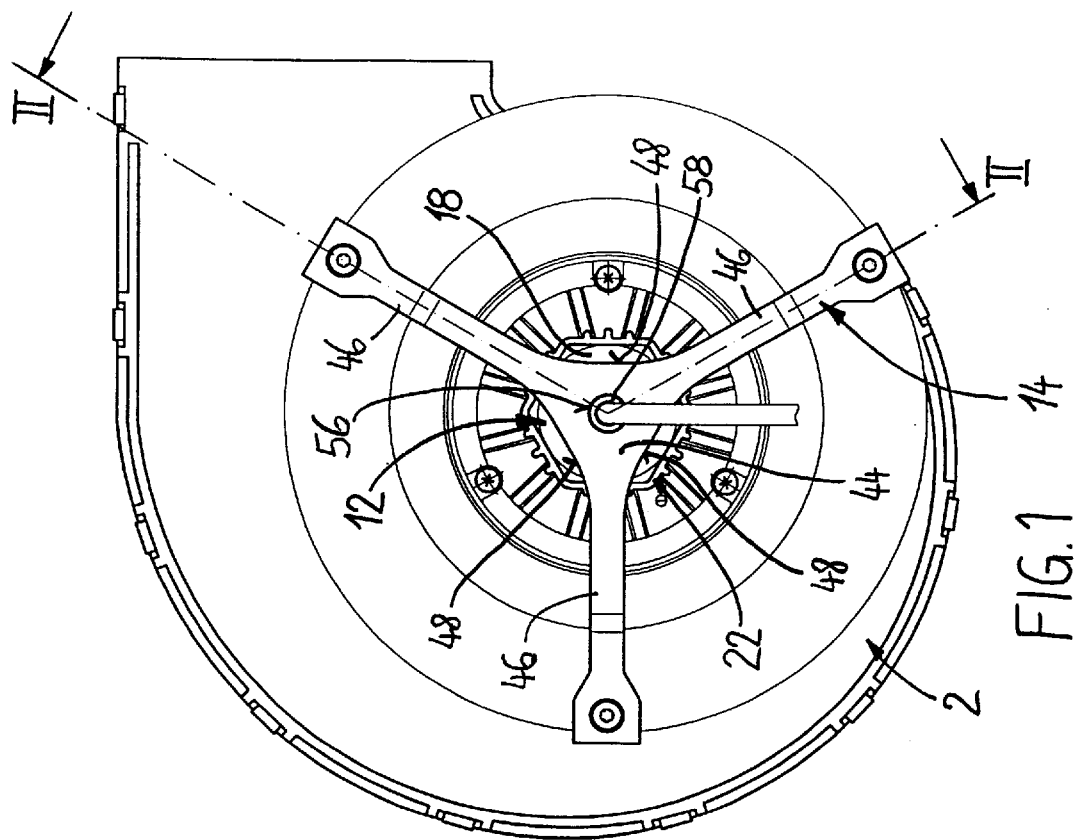
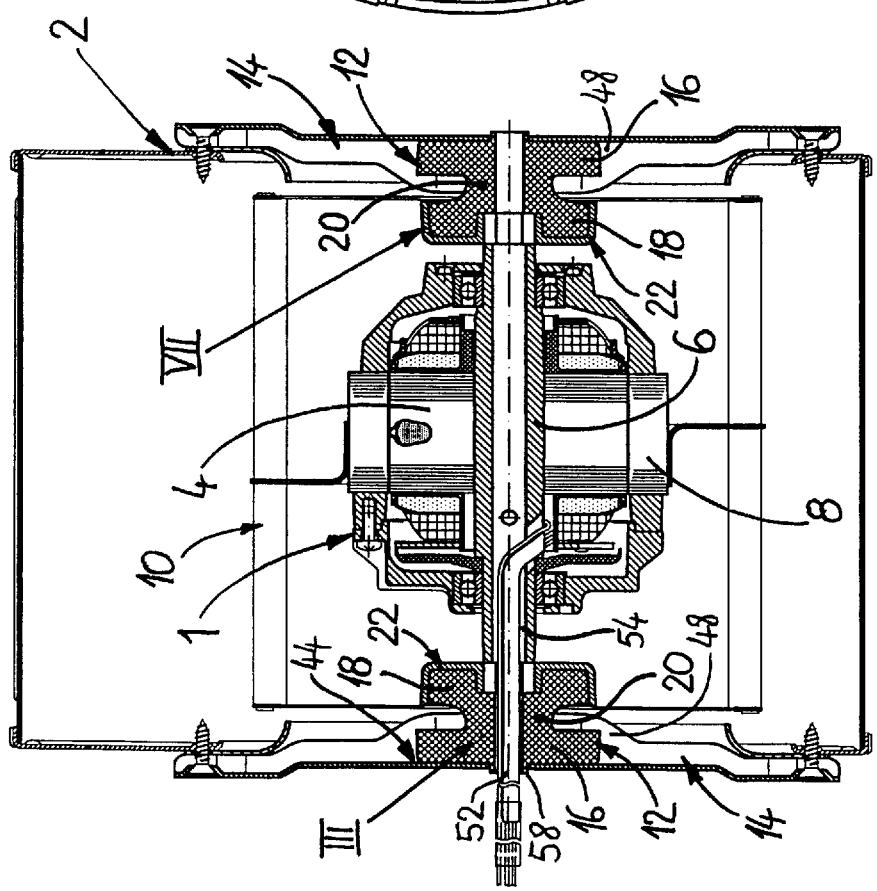

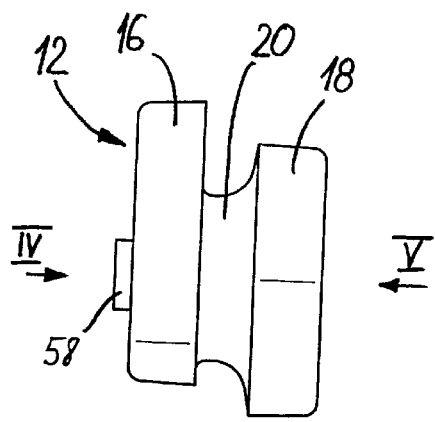
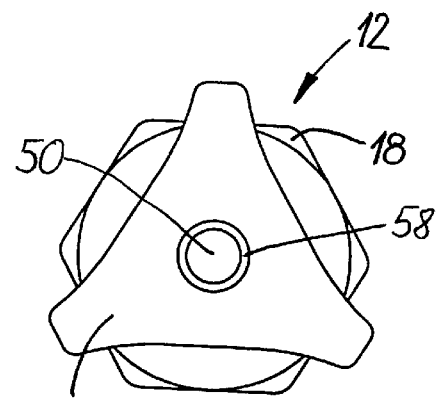
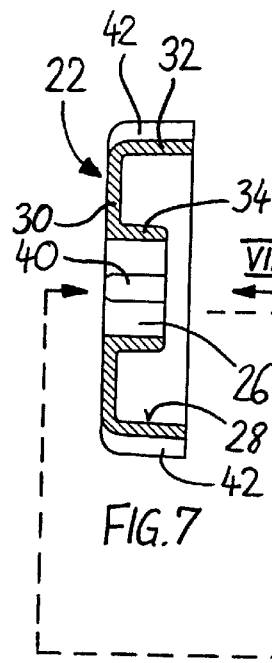
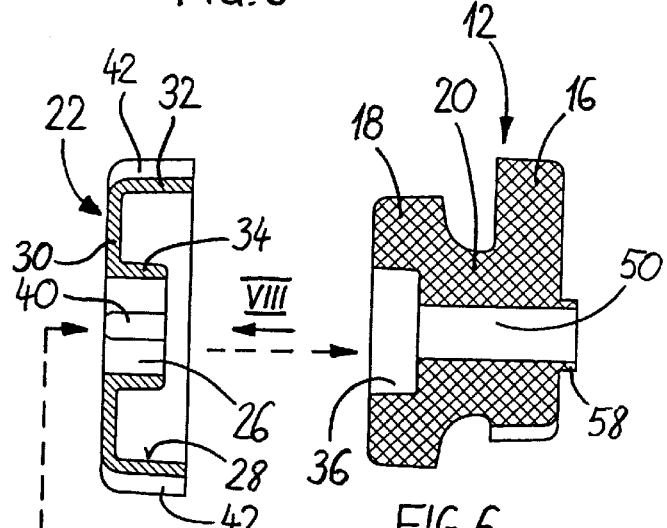
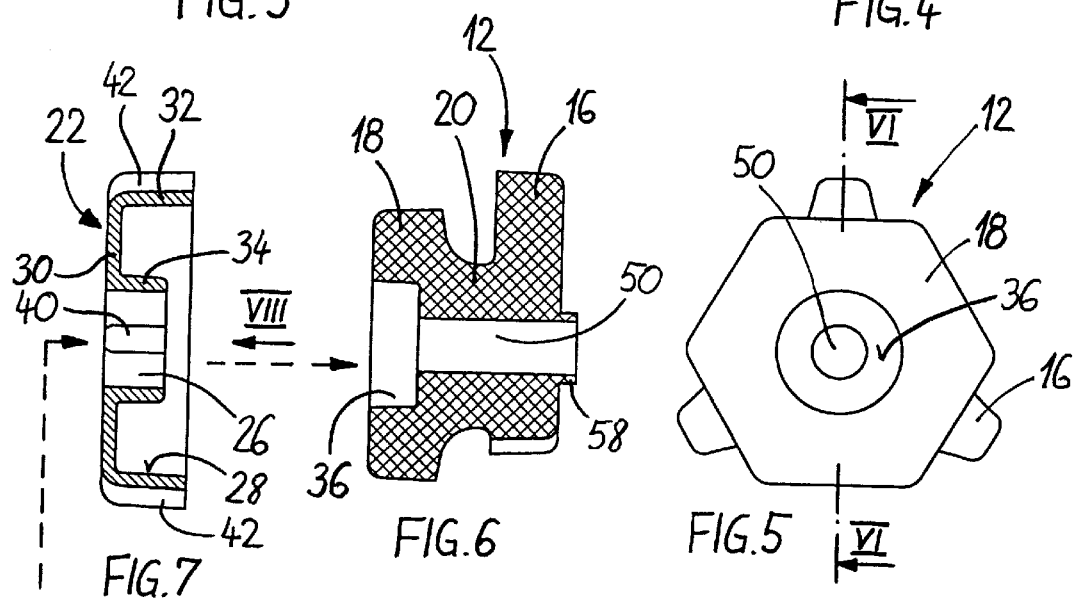
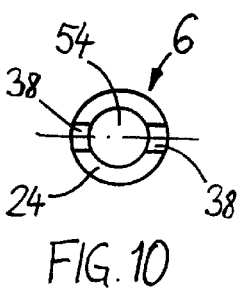
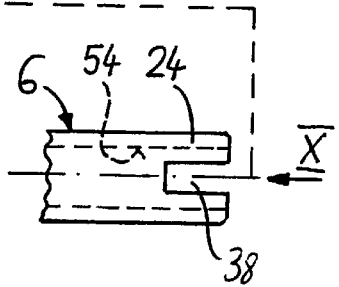

ARRANGEMENT FOR THE VIBRATION-ISOLATING SUSPENSION OF AN ELECTRIC MOTOR

BACKGROUND AND SUMMARY OF THE INVENTION

The present invention relates to an arrangement for the vibration-isolating or vibration-damped suspension of an electric motor, in particular to a fan motor in a fan housing. A non-rotating motor-supporting element is connected to a support part on at least one side via an integral elastic element. In this case, the supporting element is, in particular, designed as an elongated supporting spindle.

A fan equipped with an arrangement of this type is disclosed in U.S. Pat. No. 2,830,752. In this case, the supporting spindle engages with each of its two ends directly, in a torsion-resistant manner, into a rubber block which, for its part, is mounted in a torsion-resistant manner on a star-like support part. The intention thereby is to prevent, on the one hand, the supporting spindle from becoming distorted and, on the other hand, to dampen vibrations between the supporting spindle and the fan housing.

Similar arrangements are disclosed in DE 41 21 927 A1 and German Patent 1 175 785. Rubber-elastic elements are likewise provided in both cases for mounting the motor.

Many applications have the disadvantage, especially when starting the electric motor, but also in the event of rapid changes in rotational speed, that reaction torques are produced. These torques initially being transmitted to the supporting spindle due to the consistently very rigid connection between the motor or its stator and the supporting element or the supporting spindle. This results in each case in the supporting spindle executing a slight, jerky rotational movement. Using the known rubber elements, it has been demonstrated that these jerky rotational movements of the supporting spindle are disadvantageously transmitted to the particular support part and hence also to the housing. The result is a disturbing development of noise which is audible as a slight "clicking". Especially in applications which make use of motors having a plurality of rotational speed stages, this being the case, for example, in fan motors in exhaust hoods. "Clicking" of this type is audible with every change in rotational speed. If the motor or the fan is used in relatively large-volume appliances having relatively thin side walls, this noise, owing to structure-borne sound transmission, is clearly perceptible and therefore extremely disturbing.

The present invention is based on the object of providing a generic arrangement for the suspension of a motor, with which the development of disturbing noises is effectively reduced.

This is achieved in accordance with the invention in that the elastic element consists of three sections lying axially one behind another. These sections include a support connecting section connected to the support part in a torsion-resistant manner, a motor connecting section connected to the motor supporting element in a torsion-resistant manner, and also of an elastically deformable intermediate section arranged between the two connecting sections.

The concept "in a torsion-resistant manner" is to be understood here, in connection with the invention, as meaning that a relative distortion of the parts connected to one another is eliminated, i.e. there is a safeguard against distortion. To this end, the elastic element is preferably connected to the supporting element and/or to the support part via plug-in connections which are positive in the direction of rotation of the motor and thereby prevent relative distortions. This also makes it possible for the individual parts to be installed in a particularly simple manner simply by plugging them together.

The elastic element according to the invention leads to substantial advantages owing to the special intermediate section. The intermediate section is primarily responsible for the isolating and damping properties of the elastic element, it being advantageously capable of twisting elastically when reaction torques occur. At the same time, the properties with regard to isolating or damping vibrations and reaction torques can advantageously be influenced (set) by the selection of material and/or dimensioning of the length and/or cross section of the intermediate section within a wide range. For instance, the torsional rigidity is increased by enlarging the cross section of the intermediate section, and an axial extension of this section results in a reduction in the torsional rigidity. The jerky rotational movements of the supporting element or the supporting spindle which occur in the event of rapid changes in rotational speed and, in particular, when starting the motor are compensated for and isolated or damped in such a manner, by means of elastic distortions made possible according to the invention, in particular in the region of the intermediate section, that transmission to the support part is virtually ruled out. As a result, disturbing (clicking) noises are reliably avoided.

The following advantages, in particular, can be achieved by the invention:
1) High spring stiffness in the axial and in the radial directions. In the case of use for the suspension of a fan motor in a fan housing, the fan wheel is thereby reliably prevented from grazing against the housing.
2) Low torsional rigidity and, at the same time, a virtually linear spring characteristic. Good vibration isolation also from oscillation torques being superposed on the motor torque.
3) Simple installation preferably without screw connections, i.e. simply by plugging together therefore resulting in a very cost-effective production.
4) Avoiding of vulcanized metal-elastomer connections.
5) Advantageously little influence of, in particular axial, dimensional tolerances of the individual parts of the arrangement according to the invention on the torsional rigidity, and hence on the basic function of the vibration and torsion isolation, since the torsional rigidity of the elastic element is virtually independent of the degree of axial deformation.

Further advantageous refining features of the invention are included in the subclaims and in the description which follows.

The invention will be explained in more detail below with reference to a preferred exemplary embodiment which is illustrated in the attached drawing. In this case, the use in the case of a centrifugal blower is shown by way of example.

BRIEF DESCRIPTION OF THE DRAWINGS

FIG. 1 shows a side view (in the direction of a rotational axis) of a centrifugal blower which is fitted with a motor suspension according to the invention;

FIG. 2 shows an axial section corresponding to tha section line II—II in FIG. 1;

FIG. 3 shows a side view of an elastic element according to the invention (individual part III according to FIG. 2);

FIG. 4 shows an axial end view in the direction of arrow IV according to FIG. 3;

FIG. 5 shows a view of the other end in the direction of arrow V according to FIG. 3;

FIG. 6 shows an axial section in the plane VI—VI according to FIG. 5;

FIG. 7 shows an enlarged representation of an axial section of an individual part indicated in FIG. 2 by VII) of the arrangement according to the invention, FIG. 8 shows a plan view of this individual part in the arrow direction VIII according to FIG. 7;

FIG. 9 shows a side view of an end of the motor supporting spindle; and

FIG. 10 shows an axial end view of the supporting spindle in the direction of arrow X according to FIG. 9.

In the various figures of the drawing identical parts are always provided with the same reference numerals and, as a rule, are therefore only described once in each case.

DETAILED DESCRIPTION OF THE PREFERRED EMBODIMENT

The preferred example of use which is illustrated is concerned with suspending an electric motor 1 as a fan motor in a fan housing 2 in a manner such that it is isolated or damped with respect to vibrations. In this example, the electric motor 1 is designed as an external rotor motor, a stator 4 being secured on a fixed, i.e. non-rotating, supporting spindle 6. An external rotor 8 which surrounds the stator 4 is mounted rotatively on the supporting spindle 6 via a pivot bearing, the external rotor 8 bearing a fan wheel 10. The example of use which is illustrated is concerned with a centrifugal blower taking in air on either side.

According to FIG. 2, the supporting spindle 6 is connected to a support part 14 at least by one of its ends but preferably by both ends in an essentially identical manner (but mirror-inverted) via a respective single-part elastic element 12. Each support part 14 is, for its part, secured in a fixed location on the housing 2.

As emerges from FIG. 2 in conjunction with FIGS. 3 to 6, provision is made according to the invention for the, or each, elastic element 12 to consist of three sections lying axially one behind another, in precise terms of a support connecting section 16 connected to the support part 14 in a torsion-resistant manner, of a motor connecting section 18 connected to the supporting spindle 6 in a torsion-resistant manner, and also of an intermediate section 20 which is arranged between the connecting sections 16, 18 and can advantageously be twisted elastically. In this case, the elastic element 12 is preferably connected to the supporting spindle 6, and also to the support part 14, via simple plug-in connections, it being essential, however, for these plug-in connections to effect a positive engagement in the direction of rotation of the motor 1 and thereby to prevent relative distortions.

The motor connecting section 18 is preferably connected indirectly to the supporting spindle 6 via an additional hub part 22—cf. in this respect also FIGS. 7 and 8. For this purpose, on the one hand the supporting spindle 6 is inserted by one end-side plug-in section 24 (illustrated in FIGS. 9 and 10) positively and thereby in a torsion-resistant manner into a plug-in opening 26 in the hub part 22. This plug-in procedure is illustrated by a dashed line between FIGS. 9 and 7. On the other hand, the motor connecting section 18 has a cross section which deviates from the circular form and is, in particular, polygonal, and is seated positively and thereby in a torsion-resistant manner in a socket 28, of matching cross section, of the hub part 22. In this manner, the supporting spindle 6 is hence connected to the elastic element 12 in a torsion-resistant manner. In the preferred exemplary embodiment which is illustrated—cf. In particular FIGS. 5 and 8—the motor connecting section 18 and, accordingly, also the socket 28 of the hub part 22 in each case have a regularly polygonal, to be precise preferably a hexagonal, cross section. However, the invention is in no way limited to this.

As emerges from FIGS. 7 and 8, the hub part 22 is preferably designed in the manner of a cap with a base 30 which extends perpendicularly or radially with respect to the supporting spindle 6, a circumferential wall 32 which determines the cross section of the socket 28 (and hence also the cross section of the motor connecting section 18) and points axially in the direction of the support part 14, and with an inner, central annular extension 34 which has or surrounds the plug-in opening 26 for the supporting spindle 6 or the end-side plug-in section 24 thereof. According to FIG. 6, the motor connecting section 18 of the elastic element 12 has a central socket recess 36 for the axial annular extension 34 of the hub part 22 and the plug-in section 24, which is seated positively therein, of the supporting spindle 6. The cap-like hub part 22 can be plugged positively onto the motor connecting section 18 proceeding from FIG. 7 in the direction of the dashed arrow leading to FIG. 6.

For the positive, torsion-resistant connection between the plug-in section 24 of the supporting spindle 6 and the hub part 22, provision is preferably made, in the example shown, for the plug-in section 24 to have an axial slot 38 preferably running diametrically (FIGS. 9 and 10), there being formed within the plug-in opening 26 in the hub part 22 (cf—FIG. 8) at least one radial projection 40 which engages positively into the axial slot 38 of the plug-in section 24. The axial slot 38 determines, by means of its axial length, the insertion depth into the plug-in opening 26, i.e. the slot end brings about a limitation on insertion. The plug-in section 24 preferably has a circular outer cross section, and the plug-in opening 26 has an essentially likewise matching, circular inner cross section (apart from the preferably two diametrically opposite, radial projections 40). This preferred connection between the supporting spindle 6 and the hub part 22 advantageously also enables a reliable connection which is non-positive in the axial direction and is virtually free of circumferential play to be achieved.

As an alternative to the preferred embodiment, it is likewise possible for the plug-in section 24 and the plug-in opening 26 to be designed such that they have an outer cross section contour which deviates from the circular form, for example is polygonal, in order to be able to obtain a plug-in connection which is secure against torsion.

The hub part 22 is preferably made of metal, die-cast zinc being particularly suitable (preferably an alloy Z410 according to DIN 1734/1). This opens up the advantageous option of using the hub part 22 for conducting away heat from the motor. For this purpose, it is expedient for the hub part 22 to be fitted with external cooling ribs 42 (FIGS. 7 and 8). These advantageously enable the heat produced in the motor 1 to be effectively conducted away to the outside air by the heat first being transmitted from the stator 4 to the supporting spindle 6 - which likewise is expediently made of metal—and from there to the hub part 22, the hub part 22, assisted by the cooling ribs 42, then effectively releasing the heat to the outside air. As emerges from FIGS. 7 and 8, the cooling ribs 42 are preferably integrally formed approximately radially on the circumferential wall 32 of the cap-like hub part 22. When used as a centrifugal blower, the hub part 22 is advantageously situated in the intake region and the air taken in therefore circulates intensively around it, resulting in good cooling.

As far as the support connecting section 16 of the elastic element 12 is concerned, said section, which likewise has a cross section deviating from the circular form, is seated positively and hence in a torsion-resistant manner in an appropriately matched socket 44 of the support part 14 (cf. FIG. 2). Each support part 14 is designed—in a manner known per se—as a supporting star having, in particular, three supporting arms 46 arranged in a radially symmetrical manner. At the same time, in its central region the socket 44 for the support connecting section 16 is formed having, in particular, an essentially triangular cross section. The support connecting section 16 therefore likewise has a matching, approximately triangular cross section; cf., for this purpose, FIG. 4 in particular. Each support part 14 is expediently designed as a sheet-metal stamped part having bent over walls 48 which bound the socket 44 (FIG. 2).

The intermediate section 20 of the elastic element 12 preferably has an essentially circular cross section. According to FIG. 3, this cross section is expediently tapered with respect to the cross sections of the two adjacent connecting sections 16, 18. The isolating and damping properties can be influenced by dimensioning the length and the cross section of the intermediate section 20 and also by selecting a specific, elastomeric material, as has already been explained at the beginning.

Moreover, it is advantageous if the elastic element 12 has an axially continuous, central lead-through opening 50 for motor connecting leads 52 (cf. FIG. 2). With regard to this, the supporting spindle 6 has, at least at one end, an axial, central guide channel 54 for the connecting leads 52. This guide channel 54 preferably leads approximately radially or obliquely outwards into a connecting region of the electric motor 1, as is shown in FIG. 2. The support part 14 arranged on the connecting side likewise has a central lead-through opening 56 for the connecting leads 52 (cf. FIG. 1). It is advantageous if the elastic element 12 has an annular extension 58, engaging axially into this lead-through opening 56 in the support part 14, for protecting the connecting leads 52 against mechanical damage by the hole rim of the lead-through opening 56 (cf—also FIGS. 9–3, 4 and 6 for this purpose). This means that the lead-through opening 56 is practically cushioned by the annular extension 58 of the elastic element 12.

In addition to the preferably provided positive plug-in connections, provision may be made for the elastic element 12 also to be bonded to the hub part 22 and/or to the support part 12. This supplementary bond may, for example, be achieved by introducing silicone or the like before plugging the parts together.

The elastic element 12 is preferably composed of an elastomeric material having a hardness approximately in the region of 50–60 Shore A. EPDM (abbreviation in accordance with DIN 7728, Part I for ethylene/propylene-diene terpolymers or ethylene-propylene elastomers) is particularly suitable. However, the refinement or function according to the invention also allows elements composed of a material having a higher Shore hardness and, as a result, the aging resistance and mechanical strength thereof is improved.

In the preferred exemplary embodiment, in which both ends of the supporting spindle 6 are similarly mounted via a respective elastic element 12, the positive plug-in connections are advantageously solely fixed in the axial direction by axial deformation of the support parts 14 by the support parts 14 being secured on the housing 2 at a defined distance from one another. In this case, it has been advantageously demonstrated that axial deformation of the elastic elements 12 has virtually no influence on the torsional rigidity.

The invention is not limited to the exemplary embodiments which have been represented and described; rather it also includes all embodiments which act in the same manner as the invention. Thus, the invention is in principle also suitable for internal rotor motors, the elastic elements 12 being positioned between support parts integrally formed on the end shields and an outer mount. The shaft of the internal rotor motor can he guided outwards on one side or on both sides through the axially continuous, central lead-through opening 40 in the elastic element 12.

Furthermore, the invention is not at this point limited to the combination of features defined in claim 1 rather it can also be defined by any other combination desired of certain features of all of the individual features which have been disclosed as a whole. This means that in principle virtually any individual feature of claim 1 can be omitted or replaced by at least one individual feature disclosed at another location in the application. In this respect, claim 1 is merely to he understood as a first formulating attempt for an invention.

What is claimed is:

1. An arrangement for the torque and vibration isolating or damping suspension of an electric motor comprising a non-rotating motor-supporting element being connected to a support part at least on one side of the motor via an integral elastic element, wherein the elastic element comprises of three sections lying axially one behind another, a non-circular support connecting section connected to the support part in a torsion-resistant manner, a non-circular motor connecting section connected to the supporting element in a torsion-resistant manner, and an elastically deformable intermediate section arranged between the two connecting sections which undergoes torsional deflection between said connecting sections, wherein the supporting element is designed as an elongated supporting spindle, the motor connecting section is indirectly connected to the supporting spindle via a hub part, the hub part is designed in the manner of a cap with a base which extends perpendicularly with respect to the supporting spindle, a circumferential wall which determines the cross section of a socket and points axially in the direction of the support part, and an inner, central annular extension which surrounds a plug-in opening for the supporting spindle.

2. The arrangement as claimed in claim 1 wherein the elastic element is connected to at least one of the supporting element and the support part via plug-in connections which couple in the direction of rotation of the motor and thereby prevent relative distortions.

3. The arrangement as claimed in claim 1 wherein the electric motor is designed as an internal rotor motor, the supporting element being secured or integrally formed on a motor end shield, and a motor shaft being guided, at least at one end, through a central lead-through opening in the elastic element.

4. The arrangement as claimed in claim 1 wherein the electric motor is designed as an external rotor motor, the elongated supporting spindle is mounted, at least at one of its ends, via the elastic element and on which a stator of the electric motor is seated in a torsion-resistant manner, and an external rotor is rotatively mounted.

5. The arrangement as claimed in claim 4, wherein the supporting spindle has, at one end, an axial, central guide channel for motor connecting leads, the guide channel leading radially or obliquely outwards into a connecting region of the electric motor.

6. The arrangement as claimed in claim 1, wherein the supporting spindle is inserted by one end-side plug-in section in a torsion-resistant manner into the plug-in opening in the hub part.

7. The arrangement as claimed in claim 6, wherein the plug-in section of the supporting spindle has an axial slot running diametrically, there being formed within the plug-in opening of the hub part at least one radial projection which engages into the axial slot of the plug-in section.

8. The arrangement as claimed in claim 1, wherein the motor connecting section is polygonal, and is seated in a torsion-resistant manner in the socket, of corresponding cross section, of the hub part.

9. The arrangement as claimed in claim 8, wherein the motor connecting section and, also the socket of the hub part in each case have a regular polygonal cross section.

10. The arrangement as claimed in claim 1, wherein the motor connecting section of the elastic element has a central socket recess for the axial annular extension of the hub part and the plug-in section of the supporting spindle which is seated therein.

11. The arrangement as claimed in claim 1, wherein the hub part is made of metal, and has external cooling ribs.

12. The arrangement as claimed in claim 1, wherein the support connecting section of the elastic element is seated in a torsion-resistant manner in a matched socket of the support part.

13. The arrangement as claimed in claim 12, wherein the support part is designed as a supporting star having, three radially symmetrical supporting arms and in its central region has the socket which has an essentially triangular cross section.

14. The arrangement as claimed in claim 1, wherein the intermediate section of the elastic element has a circular cross section which is tapered with respect to the cross sections of the two connecting sections.

15. The arrangement as claimed in claim 1, wherein the elastic element has an axially continuous, central lead-through opening for motor connecting leads.

16. The arrangement as claimed in claim 1, wherein the support part has a central lead-through opening for motor connecting leads, the elastic element having an annular extension, engaging axially into the lead-through opening, for protecting the connecting leads.

17. The arrangement as claimed in claim 1 wherein the elastic element is bonded to at least one of the supporting element, the hub part, and the support part.

18. The arrangement as claimed in claim 1, wherein the elastic element is composed of an elastomeric material having hardness approximately in the region of 50–60 Shore-A.

19. The arrangement as claimed in claim 1, wherein both ends of the supporting element are similarly mounted via a respective elastic element.

20. The arrangement as claimed in claim 2, wherein the plug-in connections are fixed in the axial direction by axial deformation of the support parts.

21. An arrangement for the torque and vibration isolating or damping suspension of an electric motor comprising a non-rotating motor-supporting element being connected to a support part at least on one side of the motor via an integral elastic element, wherein the elastic element comprises of three sections lying axially one behind another, a non-circular support connecting section connected to the support part in a torsion-resistant manner, a non-circular motor connecting section connected to the supporting element in a torsion-resistant manner, and an elastically deformable intermediate section arranged between the two connecting sections which undergoes torsional deflection between said connecting sections, wherein the supporting element is designed as an elongated supporting spindle, the motor connecting section is indirectly connected to the supporting spindle via a hub part, the motor connecting section is polygonal and is seated in a torsion-resistant manner in a socket of the hub part having a corresponding cross section, the motor connecting section and also the socket of the hub part each having a regular polygonal cross section.

22. An arrangement for the torque and vibration isolating or damping suspension of an electric motor comprising a non-rotating motor-supporting element being connected to a support part at least on one side of the motor via an integral elastic element, wherein the elastic element comprises of three sections lying axially one behind another, a non-circular support connecting section connected to the support part in a torsion-resistant manner, a non-circular motor connecting section connected to the supporting element in a torsion-resistant manner, and an elastically deformable intermediate section arranged between the two connecting sections which undergoes torsional deflection between said connecting sections, wherein the supporting element is designed as an elongated supporting spindle, the motor connecting section is indirectly connected to the supporting spindle via a hub part, the supporting spindle is inserted by one end-side plug-in section in a torsion-resistant manner into a plug-in opening in the hub part, and the plug-in section of the supporting spindle has an axial slot running diametrically, there being formed within the plug-in opening of the hub part at least one radial projection which engages into the axial slot of the plug-in section.

\* \* \* \* \*

UNITED STATES PATENT AND TRADEMARK OFFICE
CERTIFICATE OF CORRECTION

PATENT NO. : 6,107,706

DATED : August 22, 2000

INVENTOR(S) : Neckermann, et al

It is certified that error appears in the above-identified patent and that said Letters Patent is hereby corrected as shown below:

In Column 2, Line 62, please delete "tha" and insert --the--.

In Column 3, Line 6, before "indicated" please insert --(--.

In Column 6, Line 23, "he" should read as --be--.

Signed and Sealed this

Twenty-ninth Day of May, 2001

Attest:

NICHOLAS P. GODICI

Attesting Officer     Acting Director of the United States Patent and Trademark Office